(12) United States Patent
Rickle

(10) Patent No.: US 6,613,227 B2
(45) Date of Patent: Sep. 2, 2003

(54) ELECTRICALLY CONDUCTIVE IN-TANK FUEL FILTER

(75) Inventor: Gary L. Rickle, Wharton, OH (US)

(73) Assignee: Kuss Corporation, Findlay, OH (US)

( * ) Notice: Subject to any disclaimer, the term of this patent is extended or adjusted under 35 U.S.C. 154(b) by 0 days.

(21) Appl. No.: 10/044,012

(22) Filed: Jan. 11, 2002

(65) Prior Publication Data

US 2003/0132156 A1 Jul. 17, 2003

(51) Int. Cl.[7] .................. B01D 35/027; B01D 35/06
(52) U.S. Cl. ............... 210/243; 210/416.4; 210/489; 210/503
(58) Field of Search ................ 210/243, 416.1, 210/416.4, 488, 489, 503, 504

(56) References Cited

U.S. PATENT DOCUMENTS

| | | | | |
|---|---|---|---|---|
| 4,522,712 A | * | 6/1985 | Fischer et al. ............. | 210/86 |
| 4,961,845 A | * | 10/1990 | Dawson et al. ............ | 204/663 |
| 4,997,555 A | * | 3/1991 | Church et al. ............. | 210/136 |
| 5,085,773 A | * | 2/1992 | Danowski ................. | 210/446 |
| 5,380,432 A | * | 1/1995 | Brandt ..................... | 210/243 |
| 6,186,713 B1 | * | 2/2001 | Bonerb ..................... | 410/100 |
| 6,220,454 B1 | * | 4/2001 | Chilton .................... | 210/483 |
| 6,382,190 B1 | * | 5/2002 | Tanabe et al. ............. | 123/509 |
| 6,464,870 B1 | * | 10/2002 | Castellanos et al. ........ | 210/243 |

* cited by examiner

Primary Examiner—Fred G. Prince
(74) Attorney, Agent, or Firm—Brinks Hofer Gilson & Lione

(57) ABSTRACT

An in-tank fuel filter includes conductive features which provide a path to a grounded component of a motor vehicle to carry away static charges generated by passage of fuel through the filter. The filter includes a filter body and an in-situ molded conductive outlet fitting and runner assembly. The filter body includes a filtration layer having a plurality of conductive strands, threads or filaments which are in electrical contact with conductive runners which are molded onto the filter body and extend from the outlet fitting which is also electrically conductive. An electrically conductive path is thus provided from the conductive strands of the filter body, through the runners to the conductive outlet fitting which is attached to a conductive (typically metal) and grounded component of a fuel pump housing.

20 Claims, 5 Drawing Sheets

ELECTRICALLY CONDUCTIVE IN-TANK FUEL FILTER

BACKGROUND OF THE INVENTION

The invention relates to an in-tank fuel filter for use in fuel tanks of motor vehicles and the like and more particularly to an in-tank fuel filter having conductive features which facilitate draining off to ground an electrical charge generated by passage of fuel through the filter.

For many years, fuel filters in motor vehicles and stationary power plant installations comprised a filter element disposed within a metallic housing at a convenient location in the fuel line. If the filter is installed in a motor vehicle, often times the filter would be disposed within the engine compartment. While hoses to and from the housing were generally rubber or other fuel tolerant flexible material and thus non-conductive, the housing was secured to a metal component or panel of the vehicle or installation and was thus grounded. Accordingly, any electrostatic charge generated by passage of the fuel through the filtration element was readily and safely grounded through the filter housing to the motor vehicle or other metallic component of the installation.

The constant examination and re-examination of vehicle weight reduction as well as continuing development of plastics and polymers has affected the fuel delivery and filtration systems of vehicles as it has most other motor vehicle systems. Rather than metal, filter housings are now frequently fabricated of a fuel tolerant plastic such as nylon. Such a construction typically results in the filtration element being electrically isolated from the vehicle ground. An electrostatic discharge (ESD) may result as a charge in the filtration element resulting from fuel passage therethrough increases and seeks ground. Frequently, such discharge occurs through the housing to the most proximate metallic vehicle body feature. Repeated discharge can result in perforation of the filter housing which is unacceptable.

It is now also common to fabricate the fuel tank from a fuel tolerant plastic or polymer material. Once again, the electrical insulating characteristics of the plastic or polymer tank isolate and insulate fuel system components disposed within the fuel tank from the vehicle ground.

A fuel filter specifically intended for in-tank installation which provides a path to ground from the filtration element to reduce the build up of electrostatic charges and the possibility of electrostatic discharges is thus both desirable and the subject of the present invention.

SUMMARY OF THE INVENTION

An in-tank fuel filter includes conductive features which provide a path to a grounded component of a motor vehicle to carry away static charges generated by passage of fuel through the filter. The filter includes a filter body and an in-situ molded conductive outlet fitting and runner assembly. The filter body includes a fabric layer having a plurality of conductive strands, threads or filaments which are in electrical contact with conductive runners which are molded onto the filter body and extend from the outlet fitting which is also electrically conductive. An electrically conductive path is thus provided from the conductive strands of the filter body, through the runners to the conductive outlet fitting which is attached to a conductive (typically metal) and grounded component of a fuel pump housing. An alternate embodiment includes a metal retaining ring which is mechanically engaged by and electrically connected to a metal register pin on the pump housing.

Thus it is an object of the present invention to provide a conductive in-tank fuel filter which reduces or eliminates electrostatic discharge within the fuel tank.

It is a further object of the present invention to provide a conductive in-tank fuel filter having an outer woven layer containing conductive strands or fibers.

It is a still further object of the present invention to provide an in-tank fuel filter having a layer of filtration material with conductive strands or fibers which are electrically connected to an electrically conductive outlet fitting.

It is a still further object of the present invention to provide an in-tank fuel filter having electrically conductive characteristics and a filtration element having plural layers.

It is a still further object of the present invention to provide an in-tank fuel filter having a conductive outlet fitting and conductive molded runners which are in electrical contact with conductive fibers disposed in filtration material.

Further objects and advantages of the present invention will become apparent by reference to the following description of the preferred and alternate embodiments and appended drawings wherein like reference numbers refer to the same component, element or feature.

DETAILED DESCRIPTION OF THE PREFERRED AND ALTERNATE EMBODIMENTS OF THE INVENTION

Figure 1:
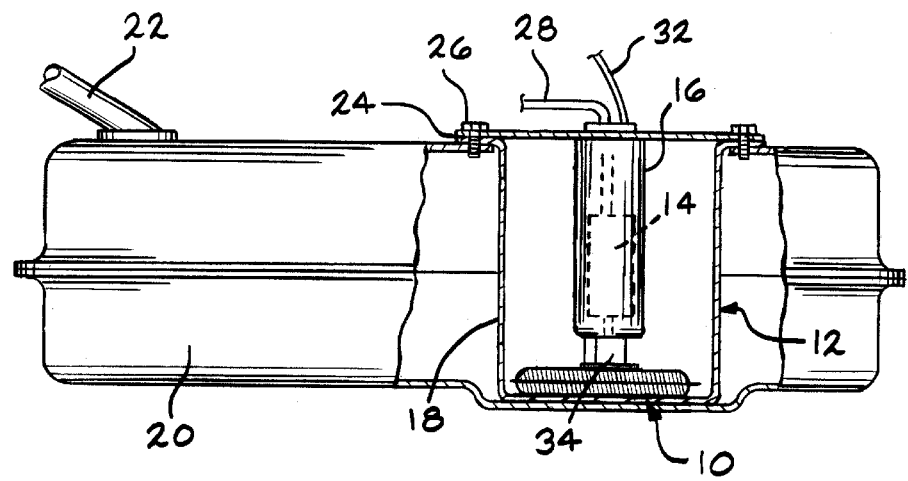
FIG. 1 is a diagrammatic, side elevational view of a motor vehicle fuel tank having a pump module and a conductive in-tank fuel filter according to the present invention.

Referring now to FIG. 1, a conductive in-tank fuel filter according to the present invention is illustrated and generally designated by the reference number 10. The conductive in-tank fuel filter 10 is disposed in an in-tank fuel module 12 which includes an electric fuel pump 14. The electric fuel pump 14 is received within a cylindrical metal. housing 16. The in-tank fuel module 12 may also include a fuel level sensor and suitable output cable (both not illustrated). The cylindrical housing 16 containing the fuel pump 14 is in turn received within a cylindrical module housing 18 which is installed within a vehicle fuel tank 20. The vehicle fuel tank 20 includes a fill tube 22 which accepts and provides fuel to the interior of the fuel tank 20. The present invention has particular application wherein the fuel tank 20 is fabricated of plastic or thermoplastic through processes such as blow molding but may also be used with a conventional metal fuel tank.

The cylindrical module housing 18 is mounted in an opening in the top of the fuel tank 20 and may be sealingly secured thereto by a suitable gasket 24 and fasteners 26 such as threaded screws, similar fasteners or other securement means such as a threaded ring (not illustrated). The electric fuel pump 14 provides fuel under pressure in an outlet or supply line 28 and is provided with electrical energy through a wire or cable 32. The conductive in-tank fuel filter 10 is releasably and semi-permanently mounted to a fuel intake or inlet fitting 34 on the cylindrical metal housing 16.

Figure 2:
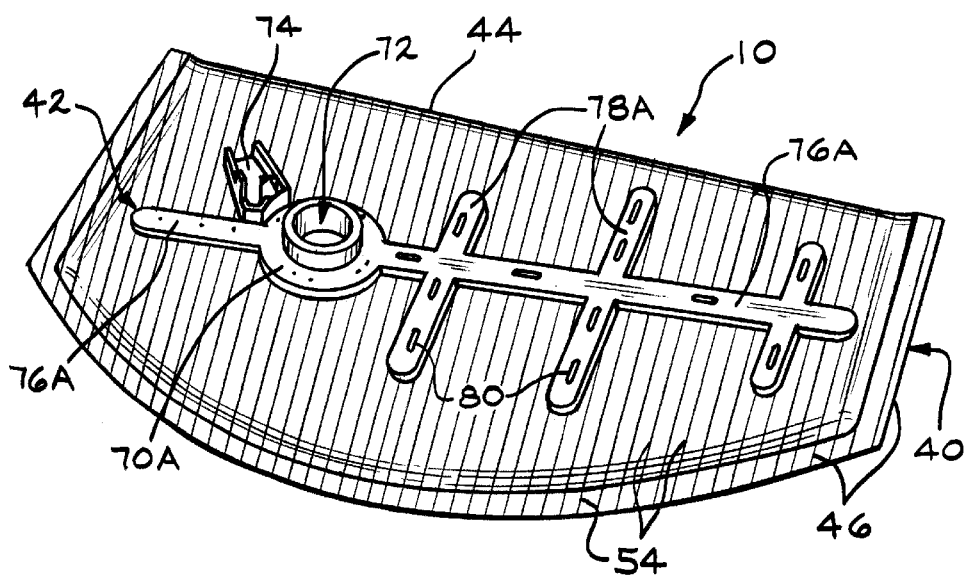
FIG. 2 is a perspective view of a conductive in-tank fuel filter according to the present invention.
Figure 3:
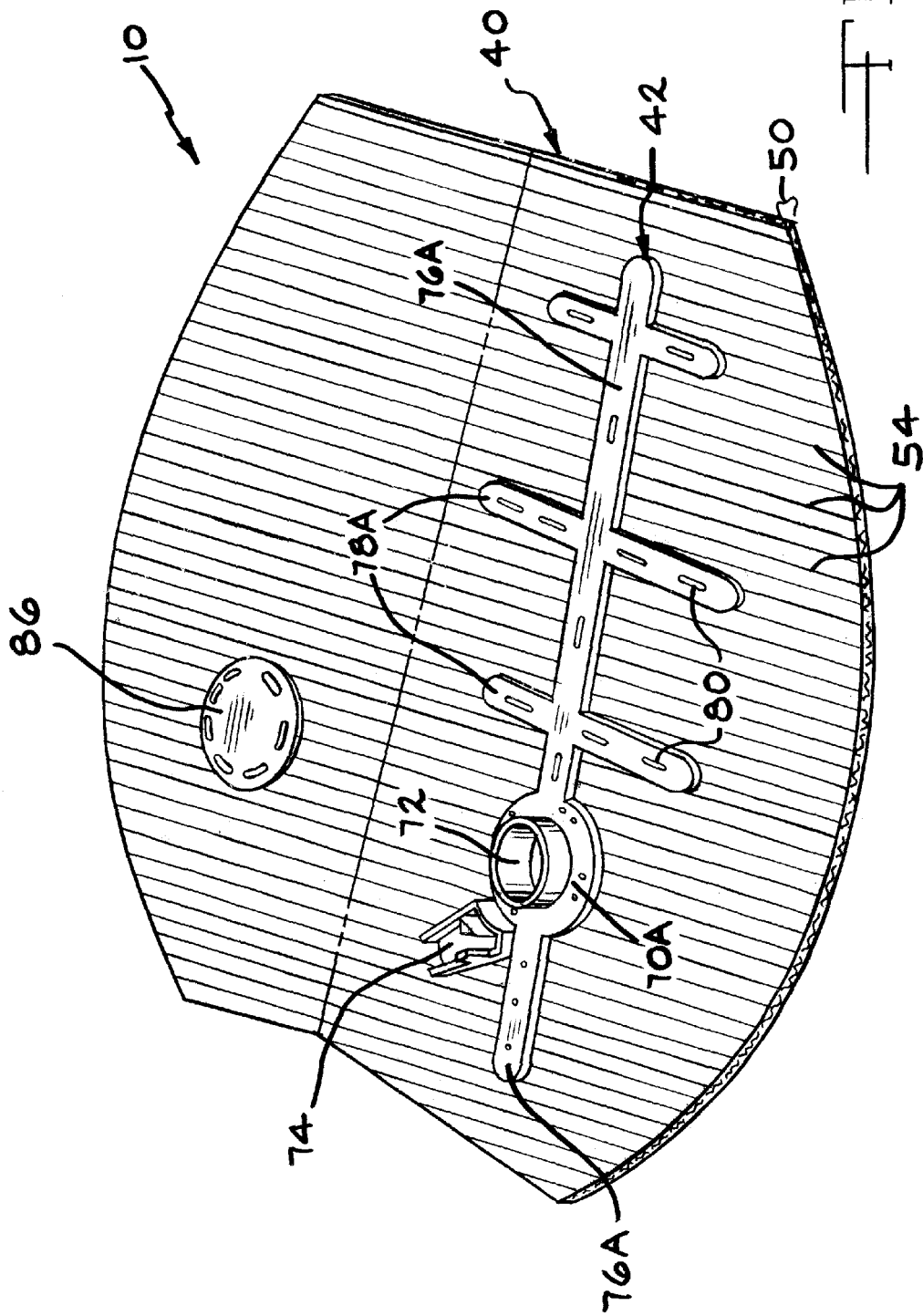
FIG. 3 is a perspective view of the exterior a conductive in-tank fuel filter according to the present invention in a pre-assembly configuration.

Referring now to FIGS. 2 and 3, the conductive in-tank fuel filter 10 includes a filter body 40 and a conductive outlet fitting and runner assembly 42 which is in-situ molded on the filter body 40. The filter body 40 may be any desired or convenient shape or footprint which typically will be dictated by the shape of and/or the available space in the associated components such as the cylindrical module housing 18. Thus, the filter body 40 may be rectangular, square, triangular, polygonal or irregular and it may include various cutouts or indentations along its various edges, again to adapt it to the shapes and spaces of associated fuel tank and fuel module components. Typically, as well, the filter body 40 will include a single folded edge 44 and multiple straight, curved or cutout sealed edges 46. The sealed edges 46 may be secured by an adhesive which is compatible with the material from which the filter body 40 is made and is also fuel tolerant, or by autogenous bonding which may be achieved by the application of heat, radio frequency (RF) or ultrasonic energy. Given the current common usage of materials such as nylon, acetal, polyester, polyethylene and fluoroplastics such as Teflon in such filter products, ultrasonic bonding is currently the preferred sealing method. Teflon is a registered trademark of the E.I. DuPont de Nemours Co.

Figure 5:
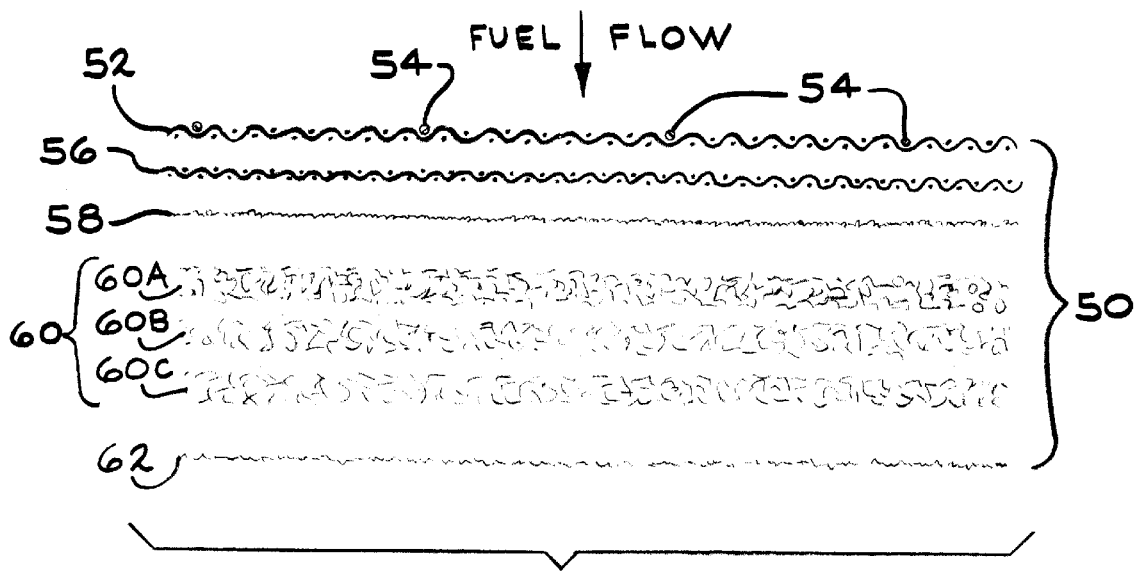
FIG. 5 is a highly enlarged fragmentary, sectional view of the filtration layers of a conductive in-tank fuel filter according to the present invention.

Referring now to FIGS. 2 and 5, the filter body 40 includes multiple layer filtration media 50 preferably having decreasing or graduated pore size which filters contaminants from the fuel and because of the graduated pore size provides improved service life. The filtration media 50 includes an outer or first layer 52 of woven, non-woven or extruded material. Materials, such as those noted directly above, may be used. When the first layer 52 is woven, approximately every 0.060 inches (1.5 mm) the warp or woof, i.e., one or the other, of the first fabric layer 52 preferably includes a fiber filament, thread or strand 54 which is conductive. Preferably also, the material from which the first fabric layer 52 is made, such as nylon, acetal, polyester, polyethylene, fluoroplastics such as Teflon or other fuel tolerant plastic or polymer is mixed with or impregnated with approximately 15% by weight of carbon additive such as carbon black so that the thread or strand 54 is rendered conductive. While a 0.060 inch conductive thread 54 to conductive thread 54 parallel spacing has been found optimal, wider spacings up to 0.080 inches (2 mm) or 0.1 inches (2.5 mm) or narrower spacings such as 0.040 inches (1.0 mm) or less may be suitable in certain applications. While good performance has been achieved with, as noted, only a fraction of the warp or woof threads being conductive, desirable performance may be achieved if fractions of both the warp and woof threads are conductive and this configuration of conductive threads or fibers 54 is considered to be within the purview of the present invention. Furthermore, in certain circumstances, it may be desirable to fabricate the outer first layer 52 of the filter body 40 entirely of conductive fibers, threads, filaments or strands 54, such that the first layer may be extruded, woven or non-woven. Surface resistivity of the first fabric layer 52 on the order of $10^{-6}$ $\Omega$/sq. is desirable and has been found suitable for this purpose.

The filtration media 50 includes a second fabric layer 56 of a fabric preferably having a thread count somewhat higher and pore size somewhat lower than the outer or first layer 52. The second fabric layer 56 may be either a woven or extruded mesh, again fabricated of any suitable stable, fuel tolerant and impervious material such as nylon, polyethylene, polyester, acetal or fluoroplastics such as Teflon. The pores or interstices in the second fabric layer 56 are typically diamond shaped and they are preferably about 500 microns by 900 microns. The opening size, however, is not critical inasmuch as it may be varied to suit both the demands of the conductive in-tank fuel filter 10 and may be adjusted to provide graduation in pore sizes from the outside of the conductive in-tank fuel filter 10 to its inside and thus the pore size may be readily varied by 25% or more.

A third layer 58 is preferably spun bonded nylon filament but may be spun bonded polyester, polyethylene, acetal, fluoroplastics such as Teflon or other stable, fuel impervious and fuel tolerant material. As utilized herein the terms spun bonded filaments and spun bonded filtration media refer to that class of non-woven materials wherein the filaments are cooled by the application of cold air immediately upon forming to stop attenuation thereof.

26 Typically, the diameters of such spun bonded filaments will be on the order of 100 microns but may readily range from between 50 and 200 microns. The third layer 58 illustrated in FIG. 5 preferably has a nominal uncompressed thickness on the order of 0.5 mm though such thickness may vary from less than about 0.25 mm up to about 1.0 mm or thicker depending upon production and application variables.

Disposed adjacent the third layer 58 of spun bonded material is a fourth composite layer 60 of finer, melt blown filaments. As utilized herein, the terms melt blown filaments and melt blown filtration media refer to that class of non-woven materials wherein the filaments are maintained at an elevated temperature by the application of hot air immediately upon forming to encourage attenuation thereof.

Typically, melt blown filaments are on the order of ten times smaller than spun bonded filaments and are thus nominally 10 microns in diameter and may readily be in the range of 5 to 20 microns. The melt blown filaments may also be nylon, polyethylene, polyester, acetal, Teflon or other stable, fuel tolerant and impervious material. Within the fourth composite layer 60, the size of the filaments and thus the size of the interstices or pores are also preferably graduated. That is, at the upper region of the fourth composite layer 60, the filaments and interstices or pores may be larger and at the lower region of the fourth layer 60, the filaments and interstices or pores may be smaller. FIG. 5 schematically represents three layers 60A, 60B and 60C of decreasing filament and pore size which provides graduated filtration of particulate matter and, as noted above, improved service life.

The filtration media 50 lastly includes a fifth layer 62 of spun bonded material. The fifth layer 62 of spun bonded material may be identical in all respects to the third layer 58 of spun bonded material. Thus, it may be made of nylon, polyester, acetal, Teflon, polyethylene or other stable, fuel tolerant and impervious material. The fifth layer 62 of spun bonded material is important in that it assists in containing the very fine melt blown fibers and prevents their breaking away and flowing into the fuel system. Further details on this type of filter may be obtained from co-owned U.S. Pat. No. 5,902,480 which is hereby incorporated by reference.

As noted above, the foregoing description of the filtration media 50 and particularly the second layer 56, the third layer 58, the composite fourth layer 60 and the fifth layer 62 are exemplary and illustrative only since it should be understood that the first conductive fabric layer 52 may be used alone if only filtration of coarse particulate matter is desired or the first conductive fabric layer 52 may be combined with diverse filtration layers, e.g., woven, non-woven and extruded, and diverse media, e.g., paper, to provide its electrically conductive capability with other filtration layers and media configurations.

Figure 4:
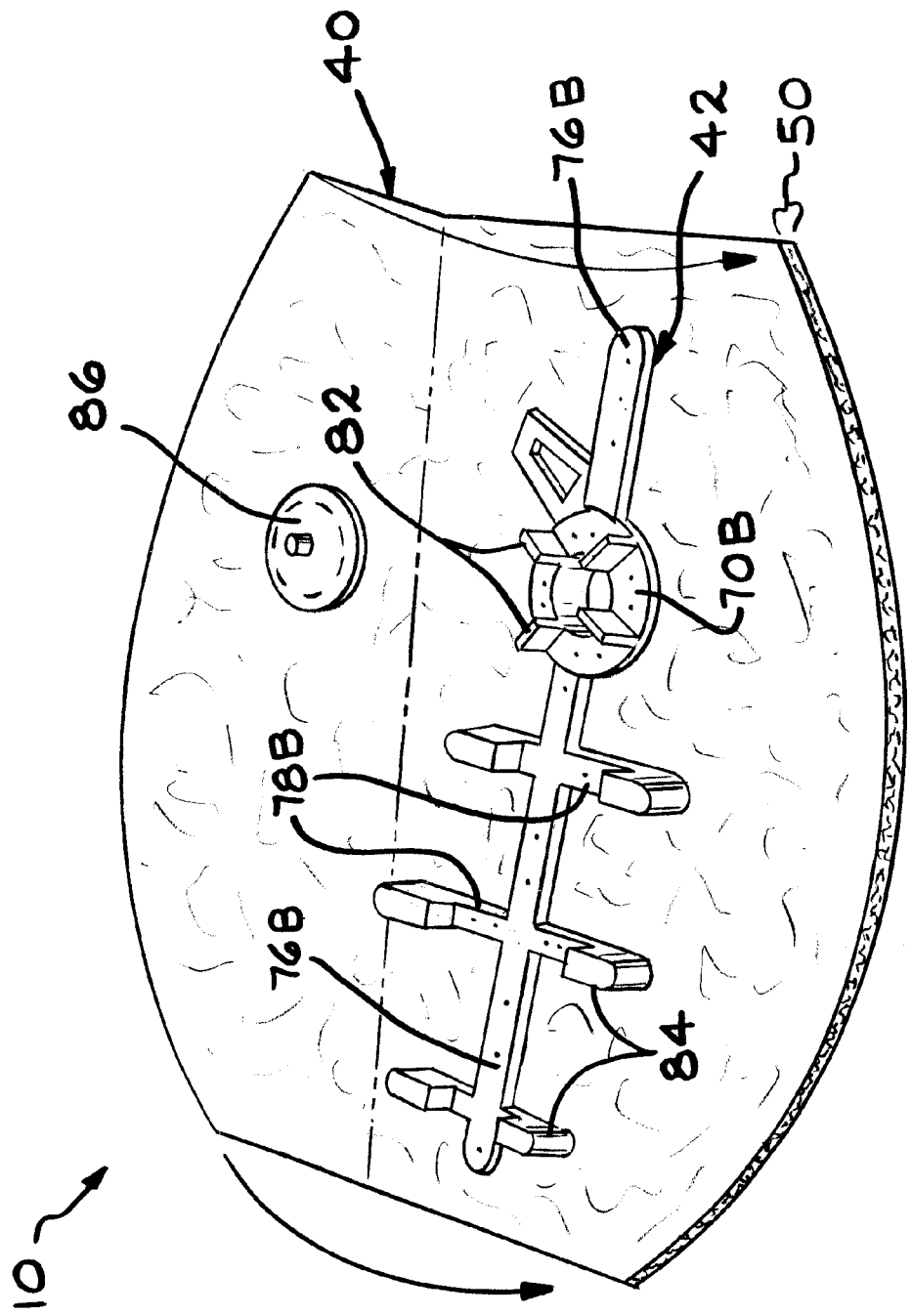
FIG. 4 is a perspective view of the interior of a conductive in-tank fuel filter according to the present invention in a pre-assembly configuration.

Referring now to FIGS. 2, 3 and 4, the conductive outlet fitting and runner assembly 42 will be described. The outlet fitting and runner assembly 42 is in-situ molded on the filter body 40 before it is folded and sealed, preferably by conventional injection molding apparatus and processes. The material from which it is molded is preferably though not necessarily the same as the material from which the first fabric layer 52 is fabricated and it, like the conductive fibers or threads 54, is preferably mixed with about 15% carbon black to render it electrically conductive. Lower percentages of carbon black, i.e. below 5%, will typically not provide the necessary electrical characteristics (conductivity) and higher percentages, i.e. above 25%, provide no significant performance, improvement will increase the cost and may compromise the physical characteristics of the plastic or polymer. The conductive outlet fitting and runner assembly 42 includes a circular outlet fitting 70A which is positioned about a through opening 72 in the filter body 40. The outlet fitting 70A includes a circular collar 74 which sealingly engages the fuel inlet fitting 34 on the cylindrical housing 16 of the in-tank fuel module 12. Preferably, the outlet and runner assembly 42 also includes a retaining fixture or clip device 74 which is configured to both rotationally orient or register the fuel filter 10 on the cylindrical housing 16 and to semi-permanently and securely retain the fuel filter 10 on the inlet fitting 34 of the cylindrical housing 16.

Extending radially from the outlet fitting 70A generally along the long axis of the filter body 40 and preferably perpendicularly to the plurality of conductive threads 54 are a pair of conductive radially oriented runners 76A. Extending out from the radial runners 76A may be one or more perpendicular stub runners 78A. The apertures or depressions 80 visible in the runners 76A and 78A are formed by projections in the mold (not illustrated) which assist and facilitate centering of the fabric body 40 on and in the conductive outlet and runner assembly 42.

FIG. 4 illustrates the opposite or inside face of the conductive outlet and runner assembly 42. Once again, there is a circular outlet region 70B. The assembly 42 also includes a pair of radially oriented runners 76B on the inside of the filter body 40 and transverse stub runners 78B which are coextensive with the runners 76A and 78A on the outside of the filter body 40. The outlet region 70B also preferably includes a plurality of circumferentially spaced apart radial projections 82 which separate the upper and lower layers of the filter body 40 and facilitate removal of fuel from the interior of the filter body 40 and flow into the fuel pump 14. The transverse stub runners 78B also preferably include lugs or projections 84 which likewise maintain separation between the upper and lower layers of the filter body 40 and facilitate fuel flow therebetween and withdrawal therefrom.

Preferably, a disc 86 is also injection and in-situ molded onto the filter body 40 in a position on the lower panel such that it generally aligns with the outlet region 70B when the filter body 40 is folded along the folded edge 44. The disc 86 both provides a stable surface which the projections 82 engage thereby ensuring separation of the upper and lower layers of the filter body 40 and also serves as a strengthening component and pressure point to facilitate installation of the conductive in-tank filter 10 upon the inlet fitting 34 of the fuel pump 14 by providing a defined location for the installer (not illustrated) to apply pressure to seat the fuel filter 10 on the inlet fitting 34 of the cylindrical housing 16.

It will be appreciated that the conductive fibers or filaments 54 of the filter body 40 collect static electrical charges from the first layer 52 and that electrical contact between such fibers or filaments 54, the stub runners 78A, the radial runners 76A, the electrically conductive outlet fitting 70A and, the inlet fitting 34 and the metal pump housing 16 provide a conductive path from the filter body 40 to the vehicle ground which receives and dissipates any static charge generated in the fabric body 40 due to fuel flow therethrough.

Figure 7:
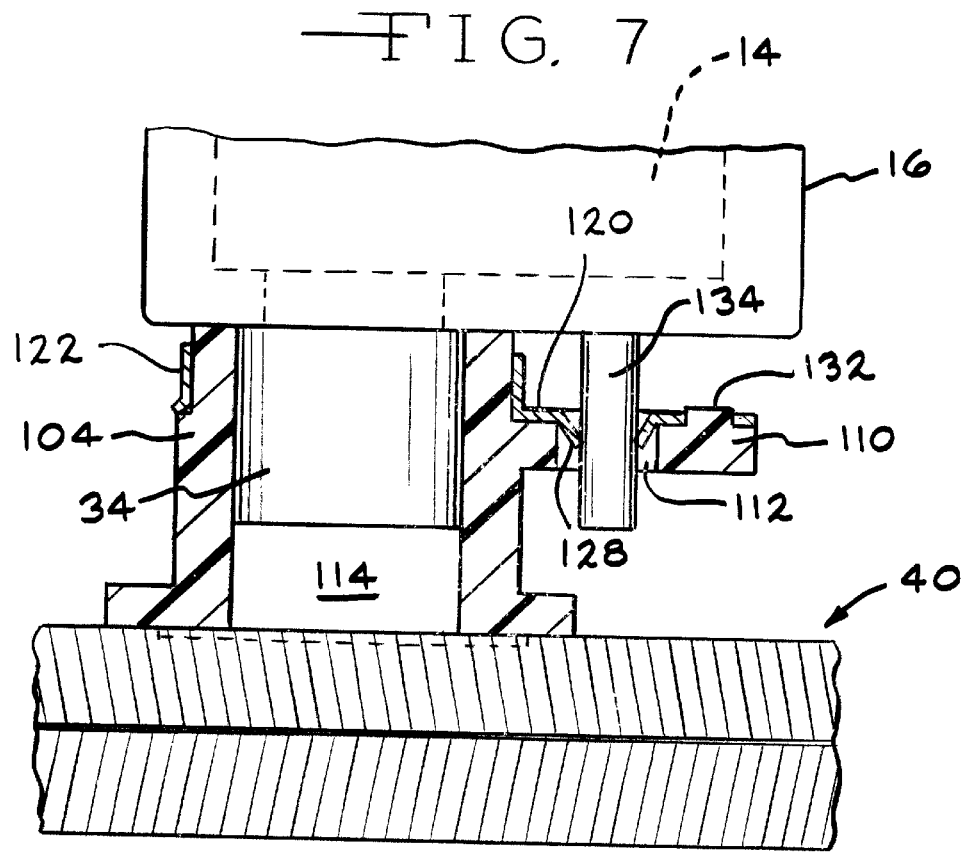
FIG. 7 is a fragmentary, sectional view of a first alternate embodiment conductive in-tank fuel filter according to the present invention secured to an in-tank fuel pump.
Figure 6:
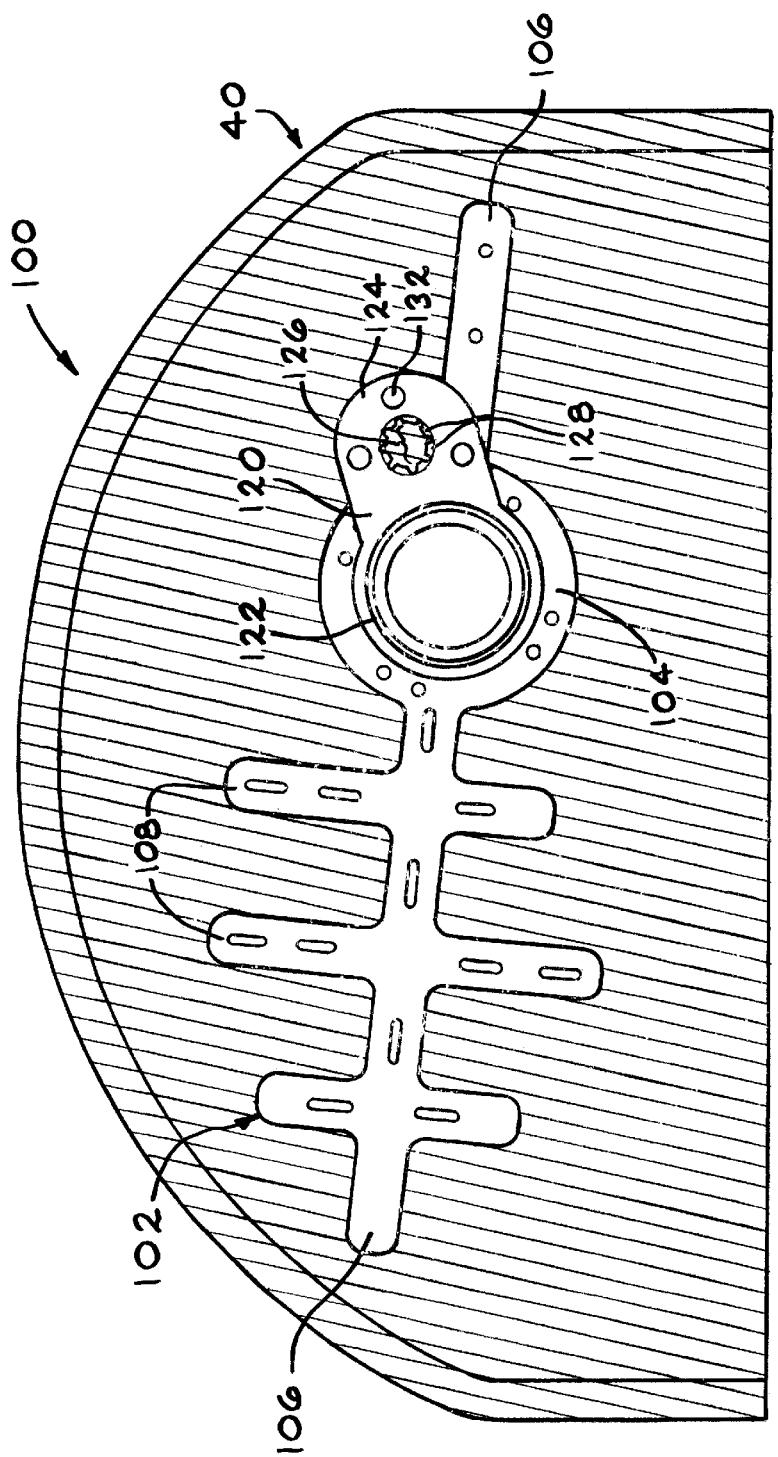
FIG. 6 is a top plan view of a first alternate embodiment conductive in-tank fuel filter according to the present invention having an alternate mounting assembly.

Referring now to FIGS. 6 and 7, a first alternate embodiment conductive in-tank filter assembly is illustrated and designated by the reference number 100. The first alternate embodiment conductive in-tank fuel filter 100 includes a filter body 40 which may be in all respects identical to the preferred embodiment filter body 40 and may be subject as well to all the variations relative to shape and fuel filtration media described above. Similarly, in-situ molded upon the filter body 40 is a conductive outlet and runner assembly 102. The conductive outlet and runner assembly 102 includes a tall cylindrical collar or outlet fitting 104 and a pair of radial runners 106 which merge with and are in electrical contact with a plurality of transverse or stub runners 108. The cylindrical collar or fitting 104 includes a radially extending ear or lug 110 defining a through opening 112 parallel and spaced from a through opening 114 defined by the outlet fitting.

Secured about the outlet fitting 104 is a metal fitting 120 which defines a circular region 122 which tightly receives the cylindrical collar or outlet fitting 104. The metal fitting 120 includes a plate or ear portion 124 which is generally coextensive with the ear or lug 110 and defines a through opening 126 having a plurality of oblique fingers or prongs 128 about its periphery. The oblique prongs 128 cooperatively function as a one-way retaining feature. The metal fitting 120 is retained upon the lug or ear 110 by a plurality of stubs or projections 132 which are received within complementary openings in the plate or ear portion 124 and then deformed by heat or the other application of energy to positively retain the metal fitting 120 on the outlet fitting 104 and the ear or lug 110. The plurality of projections 128 cooperatively receive and engage a positioning or register pin 134 which extends from the bottom of the cylindrical housing 16 adjacent the inlet fitting 34. Cooperation between the register pin 134 and the oblique prongs 128 positively positions and secures the first alternate embodiment conductive in-tank filter assembly 100 to the cylindrical housing 16.

It will also be appreciated that the conductive fibers or filaments 54 of the filter body 100 collect static electrical charges and that electrical contact between such fibers or filaments 54, the transverse runners 108, the radial runners 106, the electrically conductive cylindrical portion 104, the metal and therefore electrically conductive fitting 120, the metal register pin 134 and the metal pump housing 16 provide a conductive path from the filter body 100 to the vehicle ground which receives and dissipates any static charge generated in the fabric body 40 due to fuel flow therethrough.

The foregoing disclosure is the best mode devised by the inventor for practicing the invention. It is apparent, however, that conductive filtration devices incorporating modifications and variations will be obvious to one skilled in the art of fuel filtration. Inasmuch as the foregoing disclosure is intended to enable one skilled in the pertinent art to practice the instant invention, it should not be construed to be limited thereby but should be construed to include such aforementioned obvious variations and be limited only by the spirit and scope of the following claims.

I claim:

1. A conductive in-tank fuel filter comprising, in combination,
- a filtration body defining an outlet opening and having at least one layer of filtration media, said filtration media including electrically conductive and non-conductive strands, and
- an electrically conductive assembly molded on said filtration body including an outlet fitting disposed about said outlet opening and at least one runner extending from said outlet fitting,
- whereby said runner provides an electrical path from said electrically conductive strands to said outlet fitting.

2. The conductive in-tank fuel filter of claim 1 wherein said filtration media is selected from the group consisting of nylon, polyester, acetal, polyethylene and fluoroplastic.

3. The conductive in-tank fuel filter of claim 1 wherein said filtration body includes a folded edge and aligned edges and a seal along said aligned edges.

4. The conductive in-tank fuel filter of claim 1 further including an additional layer of filtration media.

5. The conductive in-tank fuel filter of claim 1 wherein said outlet fitting includes a structure for assisting retention of said filter body on a fuel pump.

6. The conductive in-tank fuel filter of claim 1 wherein said conductive strands and conductive assembly are made of a polymer mixed with carbon.

7. The conductive in-tank fuel filter of claim 1 wherein said conductive strands are parallel and spaced apart about 0.40 inches to 0.80 inches.

8. An in-tank fuel filter comprising, in combination,
- a filtration body defining an interior, an outlet opening providing communication with said interior and at least one layer of filtration material, at least a portion of said filtration material being electrically conductive, and
- an electrically conductive assembly disposed on said filtration body, said assembly including an outlet fitting disposed about said outlet opening and at least one runner connected to said outlet fitting and adapted to provide an electrical path from at least a portion of said electrically conductive material to said outlet fitting.

9. The in-tank fuel filter of claim 8 wherein said filtration material is selected from the group consisting of nylon, polyester, acetal, polyethylene and fluoroplastic.

10. The in-tank fuel filter of claim 8 further including at least two additional layers of filtration material.

11. The in-tank fuel filter of claim 8 wherein said outlet fitting includes a structure for assisting retention of said filter body on a fuel pump.

12. The in-tank fuel filter of claim 8 wherein said electrically conductive portion of said filtration material and said conductive assembly are made of a polymer mixed with carbon.

13. The in-tank fuel filter of claim 8 wherein said filtration material is woven and said electrically conductive portion of said filtration material includes a plurality of parallel strands and said strands are spaced apart about 0.40 inches to 0.80 inches.

14. A conductive in-tank fuel filter comprising, in combination,
- a filter body defining an interior, an outlet opening providing communication with said interior and one layer of filtration material, said filtration material including electrically conductive filaments, and
- an electrically conductive assembly in-situ molded on said filter body, said assembly including a conductive outlet fitting disposed about said outlet opening and at least one runner adapted to provide an electrical path from at least a portion of said electrically conductive filaments to said outlet fitting.

15. The conductive in-tank fuel filter of claim 14 wherein said filtration material is selected from the group consisting of nylon, polyester, acetal, polyethylene and fluoroplastic.

16. The conductive in-tank fuel filter of claim 14 further including an additional layer of filtration material.

17. The conductive in-tank fuel filter of claim 14 wherein said outlet fitting includes a structure for assisting retention of said filtration body on a fuel pump.

18. The conductive in-tank fuel filter of claim 17 wherein said retention assisting structure includes a metal ring having an opening defined by a plurality of fingers.

19. The conductive in-tank fuel filter of claim 14 wherein said conductive filaments and said conductive assembly are made of a polymer mixed with carbon.

20. The conductive in-tank fuel filter of claim 14 wherein said filtration material is woven and said conductive filaments are parallel and spaced apart about 0.40 inches to 0.80 inches.

* * * * *